United States Patent
Pirvu

(10) Patent No.: US 9,286,089 B2
(45) Date of Patent: Mar. 15, 2016

(54) JUST-IN TIME EXPENSIVE COMPILATION HINTS

(71) Applicant: International Business Machines Corporation, Armonk, NY (US)

(72) Inventor: Marius Pirvu, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 14/162,929

(22) Filed: Jan. 24, 2014

(65) Prior Publication Data

US 2015/0212838 A1 Jul. 30, 2015

(51) Int. Cl.
*G06F 9/45* (2006.01)
*G06F 9/455* (2006.01)

(52) U.S. Cl.
CPC .................................. *G06F 9/45516* (2013.01)

(58) Field of Classification Search
None
See application file for complete search history.

(56) References Cited

U.S. PATENT DOCUMENTS

| | | | |
|---|---|---|---|
| 6,289,506 B1 * | 9/2001 | Kwong et al. | 717/148 |
| 7,770,161 B2 | 8/2010 | Mitran et al. | |
| 8,281,311 B2 | 10/2012 | Barsness et al. | |
| 2004/0073904 A1 * | 4/2004 | Hill | 718/1 |
| 2009/0049432 A1 * | 2/2009 | Pirvu | 717/148 |
| 2011/0035735 A1 | 2/2011 | Kramp et al. | |
| 2012/0144377 A1 | 6/2012 | Pirvu | |
| 2013/0067441 A1 | 3/2013 | Lafreniere et al. | |

OTHER PUBLICATIONS

Arn0ld et al., "Improving Virtual Machine Performance Using a Cross-Run Profile Repository", OOPSLA '05 Proceedings of the 20th annual ACM SIGPLAN conference on Object-oriented programming, systems, languages, and applications, Oct. 16-20, 2005, San Diego, CA, USA, Copyright 2005 ACM, pp. 297-311.

Cole, Ant, "Beta2 now available", IBM SDK, Java Technology Edition Version 8, Feb. 25, 2013, <https://www.ibm.com/developerworks/community/forums/html/topic?id=7f8386a2-8939-4404-90fa-bc94737432c7>, Grace Period Disclosure.

Corrie, Ben, "Java Technology, IBM style: Class sharing", IBM, May 30, 2006, <http://www.ibm.com/developerworks/java/library/j-ibmjava4/>.

IBM, "Open beta program for IBM SDK for Java 8", no earlier than Feb. 25, 2013, <http://www.ibm.com/developerworks/java/jdk/beta/index.html>, Grace Period Disclosure.

(Continued)

*Primary Examiner* — Wei Zhen
*Assistant Examiner* — Daxin Wu
(74) *Attorney, Agent, or Firm* — Stephen Darrow

(57) ABSTRACT

Using stored information about the compilation environment during compilation of a code segment to improve performance of just-in-time compilers. A set of characteristic(s) of a compilation environment is measured during compilation of a code segment. Information that may be relevant to how the compilation is performed is derived from at least one of the measured characteristics and stored in a persistent storage device. Upon a subsequent request to compile that code segment, the information is retrieved and used to change compilation behavior. The set of characteristic(s) relate to at least either compilation backlog or peak memory usage. The changed compilation behavior involves at least adjusting the scheduling of the subsequent compilation request or adjusting the compiler optimization level.

4 Claims, 4 Drawing Sheets

(56) References Cited

OTHER PUBLICATIONS

IBM, "IBM SDK, Java Technology Edition, V8: Beta Program, latest news and informatiion", no earlier than Feb. 25, 2013, no later than Sep. 26, 2013, <http://www/-01.ibm.com/support/docview.wss?uid=swg21615834>, Grace Period Disclosure.

Krintz, Chandra, "Coupling On-Line and Off-Line Profile Information to Improve Program Performance", CGO '03 Proceedings of the international symposium on Code generation and optimization: feedback-directed and runtime optimization, pp. 69-78, IEEE Computer Society Washington, DC, USA Copyright 2003.

Krintz et al., "Using Annotations to Reduce Dynamic Optimization Time", Technical Report, University of California at San Diego La Jolla, CA, USA © 2000.

Kulkarni, Prasad, "JIT Compilation Policy for Modern Machines", OOPSLA'11, Oct. 22-27, 2011, Portland, Oregon, USA, Copyright © 2011 ACM, pp. 773-787.

Namjoshi et al., "Novel Online Profiling for Virtual Machines", VEE'10, Mar. 17-19, 2010, Pittsburgh, Pennsylvania, USA, Copyright © 2010 ACM, pp. 133-144.

Ogata et al., "A Study of Java's Non-Java Memory", OOPSLA/SPLASH'10 Oct. 17-21, 2010, Reno/Tahoe, Nevada, USA, Copyright © 2010 ACM, pp. 191-204.

Pilkington et al., "Enhance performance with class sharing", Sep. 30, 2008, <http://www.ibm.com/developerworks/library/j-sharedclasses/>.

Pominville et al., "A Framework for Optimizing Java Using Attributes", CASCON '10, CASCON First Decade High Impact Papers, pp. 225-241, IBM Corp., Riverton, NJ, USA © 2010.

Sandya, S.M., "Jazzing up JVMs with off-line profile data—Does it Pay?", ACM SIGPLAN, vol. 39 (8), Aug. 2004, pp. 72-80.

\* cited by examiner

JUST-IN TIME EXPENSIVE COMPILATION HINTS (1) Cole, Ant, "Beta2 now available", IBM SDK, Java Technology Edition Version 8, Feb. 25, 2013.

(2) IBM, "Open beta program for IBM SDK for Java 8", no earlier than Feb. 25, 2013.

(3) IBM, "IBM SDK Java Technology Edition, V8: beta Program, latest news and information", no earlier than Feb. 25, 2013, no later than Sep. 26, 2013.

BACKGROUND OF THE INVENTION

The present invention relates generally to the field of computer code compilation, and more particularly to just-in-time (JIT) compiler performance optimization.

Bytecode is a binary representation of program code that is an intermediate representation between source code and machine code. Bytecode is typically more "portable" than machine code, meaning that bytecode tends to reduce code dependence on a limited set of hardware and/or operating system environments. At the same time, bytecode is also typically more efficient than source code in that it can usually be translated into machine code (also called "native machine language") during runtime much faster than source code can be translated into machine code. Bytecode may be "compiled" into native machine language for execution, or it may be executed on a virtual machine that "interprets" the bytecode as it runs. Different sections of the bytecode used in a single program can be handled in different ways. For example, some sections may be compiled, while others are interpreted.

Just-in-time (JIT) compilation, also referred to as dynamic translation, is a method for compiling software code from a source format, such as bytecode, to native machine language. JIT compilation is a hybrid approach to code conversion, with compilation occurring during runtime, similar to how interpreters operate during runtime, but in chunks, as with traditional, ahead-of-time compilers. Often, there is caching of compiled code (also called "translated code") to improve performance.

Some compilers, including some JIT compilers, have the ability to compile code to varying degrees of "code optimization." Typically, the greater the degree of code optimization, the faster the code executes, but this optimized code generally comes at a cost, including longer compilation times.

JAVA is a well known class-based, object-oriented computer programming language. In the context of JAVA, a "method" is a subroutine, or procedure, associated with a class. JAVA source format code is typically translated to bytecode that can be run on a JAVA Virtual Machine (JVM) regardless of the underlying hardware or software platform. JVMs often employ JIT compilation to convert JAVA bytecode into native machine code, which can: (i) improve application runtime performance (for example, speed) relative to interpretation; and (ii) include late-bound data types and adaptive optimization, unlike ahead-of-time compilation. (Note: the term(s) "JAVA" may be subject to trademark rights in various jurisdictions throughout the world and are used here only in reference to the products or services properly denominated by the marks to the extent that such trademark rights may exist.)

SUMMARY

According to one aspect of the present invention, there is a computer program product, system and/or method which performs the following actions (not necessarily in the following order and not necessarily in serial sequence): (i) measuring a set of characteristic(s) of a compilation environment during a compilation of a code segment by a just-in-time compiler; (ii) determining a first piece of information based upon at least one characteristic of the set of characteristic(s), with the first piece of information being relevant to a manner in which just-in-time compilation of the code segment may be performed; (iii) storing the first piece of information in a persistent storage device; (iv) responsive to a subsequent compilation request for the just-in-time compiler to compile the code segment, reading the first piece of information from the persistent storage device; and (v) changing compilation behavior based on the first piece of information when the code segment is again compiled by the just-in-time compiler in response to the subsequent compilation request. The set of characteristic(s) of a compilation environment relate to at least one of the following: (i) compilation backlog, and/or (ii) peak memory usage. The changing of compilation behavior includes at least one of the following: (i) scheduling the subsequent compilation request, and/or (ii) adjusting a compiler optimization level.

DETAILED DESCRIPTION

Figure 1:
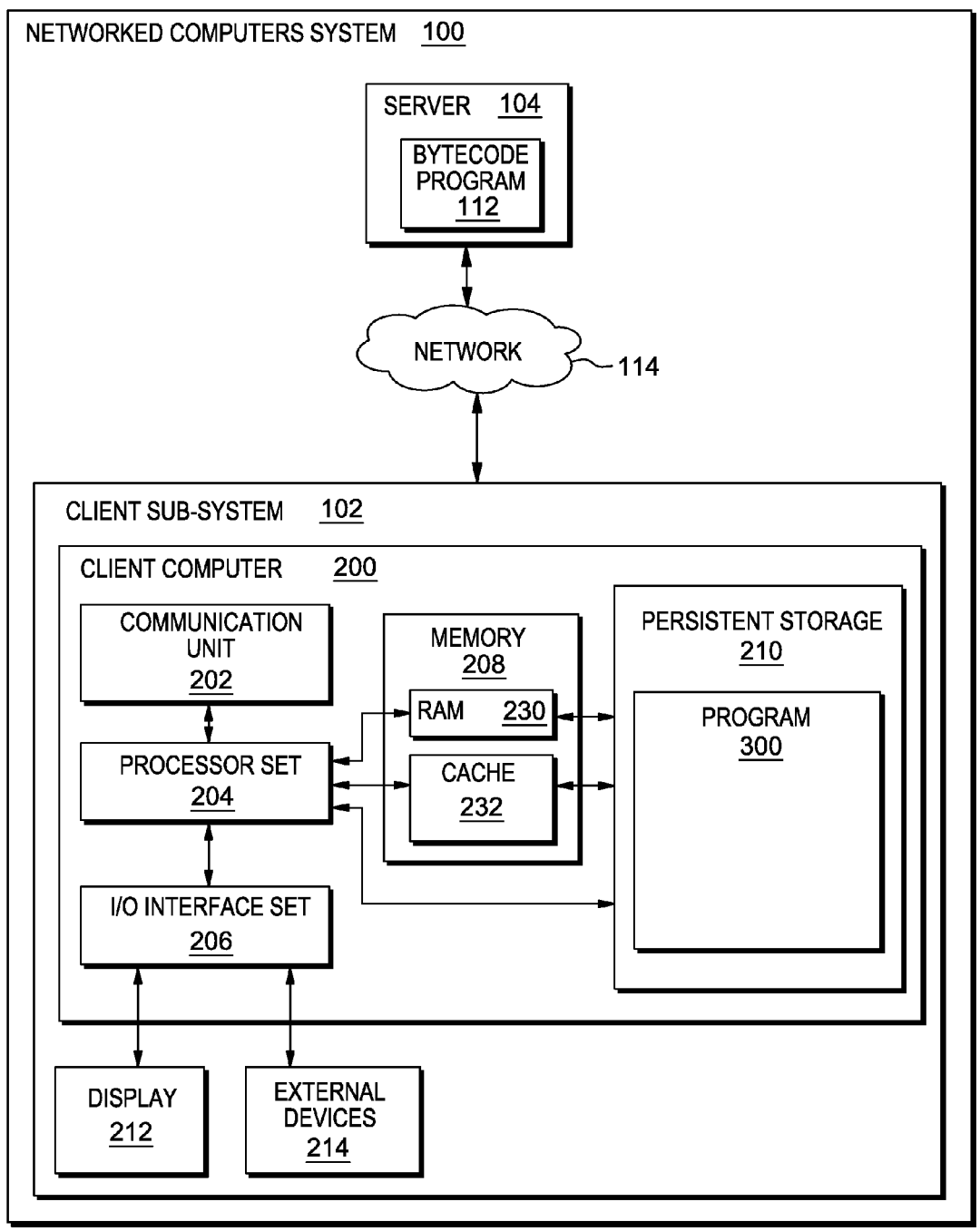
FIG. 1 is a schematic view of a first embodiment of a networked computers system according to the present invention.

Some embodiments of the present invention store specific hints about expensive just-in-time (JIT) compilations in a persistent storage and make use of this information in subsequent runs to influence JIT compilation decisions and improve various performance metrics. During the first invocation of a JAVA program, the JIT compiler determines the set of code fragments that are expensive to compile according to a set of metrics that can be easily measured. Such metrics may include the increase in compilation backlog while the compilation of a code fragment takes place and/or the peak memory consumed during the compilation. For each code fragment deemed expensive to be compiled from the point of view of a given metric and for a specific optimization level, the JIT compiler stores on persistent storage hints about the compilation expense. Such hints may be the raw values of the metrics of interest or compressed forms of such values (down to Boolean information representing "expensive" or "not expensive" relative to a threshold). During the second invocation of a JAVA program, the JIT compiler retrieves the "expensive compilation hints" from persistent storage and uses this information to: (i) direct the scheduling of the compilations; (ii) decide on the optimization level to be applied to compilations; and/or (iii) change the heuristics used for memory allocation/deallocation during compilation. These actions can result in: (i) smaller peak memory requirements for the JAVA application; (ii) reduced compilation overhead; and/or (iii) reduced service time for the compilation requests waiting to be fulfilled.

This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as JAVA, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: client sub-system 102; server 104; bytecode program 112; communication network 114; client computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with server 104 via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with client computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. EXAMPLE EMBODIMENT

Figure 2:
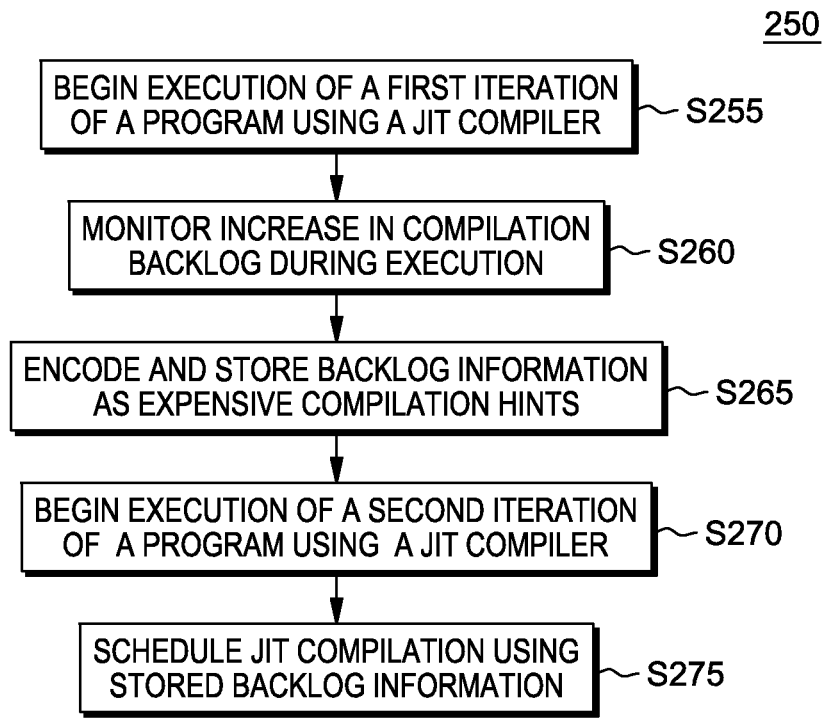
FIG. 2 is a flowchart showing a process performed, at least in part, by the first embodiment system.
Figure 3:
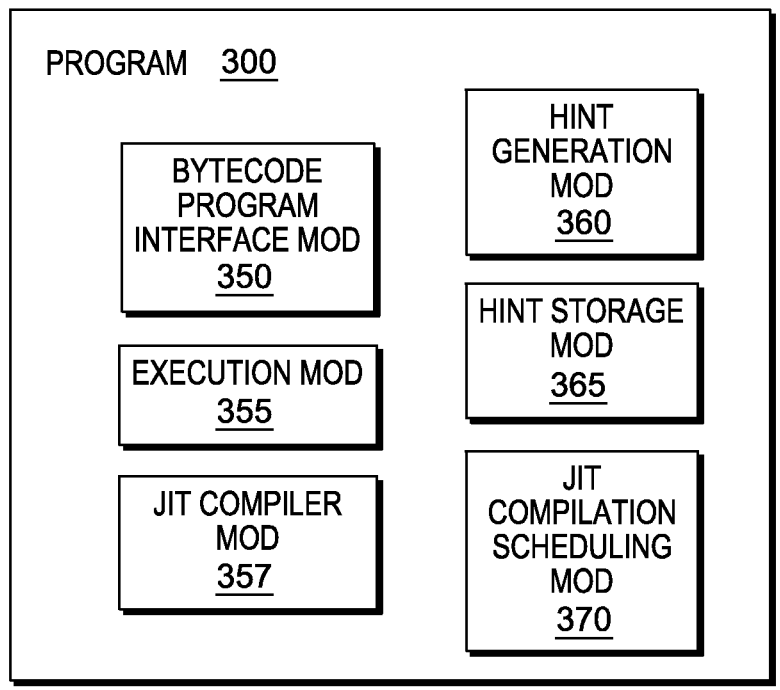
FIG. 3 is a schematic view of a portion of the first embodiment system.

FIG. 2 shows flowchart 250 depicting a method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where execution mod 355 of program 300 begins to execute a first iteration of bytecode program 112 (see FIG. 1), downloaded via bytecode program interface mod 350. As execution proceeds, execution mod 355 dispatches segments of bytecode program 112 to JIT compiler mod 357 so that those segments can be converted into machine code using just-in-time compilation (while the compilation is carried out, the interpreter can execute (interpret) the respective code fragments; when the compilation is finished, the JAVA application will execute the compiled (native) version of the code fragments). Alternatively, some other embodiments may download segments of bytecode in a just-in-time fashion as well, and/or different segments of bytecode program 112 may come from different locations in network 114.

Processing proceeds to step S260, where, as compiler mod 357 compiles each segment of bytecode program 112, hint generation mod 360 monitors the increase in the compilation backlog as an indication of how "expensive" compilation of the current segment is. Alternatively or in addition, hint generation mod 360 may monitor other characteristics of the compilation environment, such as memory usage, to provide an indication of compilation expense. To gather the expense information, the JIT compiler must perform the compilation. Otherwise, it can only make educated guesses.

Processing proceeds to step S265, where hint storage mod 365 encodes and stores for possible future use the compilation expense information gathered in step S260. The change in backlog size is compared to a fixed threshold to decide if a compilation segment should be deemed "expensive," and the result of this comparison is stored for future use. Alternatively, the threshold may be dynamically set based on statistical formulas meant to detect outlier values that are significantly larger (more "expensive") than the average. Those of ordinary skill in the art will recognize that numerous other alternatives are possible, such as combining multiple metrics in various ways to make an expense determination, storing separate or combined metric information at various degrees of granularity, or even storing the raw metrics themselves (whether for all code segments or only for those segments deemed expensive), in which case the expense determination may be postponed until the compile time during which it will be applied. Likewise, the metrics and/or expense determinations may be stored in shared class files, with the uncompiled code segments, or in a dedicated store, to name a few possibilities.

Processing proceeds to step S270, where execution mod 355 begins a second execution of bytecode program 112 using JIT compiler mod 357. Alternatively, execution mod 355 may run a different "program" that includes segments from bytecode program 112, or for which expense hints otherwise already exist and can be accessed.

Processing proceeds to step S275, where, as execution proceeds and segments of bytecode program 112 are dispatched for just-in-time compilation, JIT compilation scheduling mod 370 accesses the stored compilation hints and sets queuing priorities accordingly. For example, a segment which has been deemed expensive is given a relatively low queue priority and so will be placed in the queue behind other segments that have been assigned higher priorities.

Figure 4A:
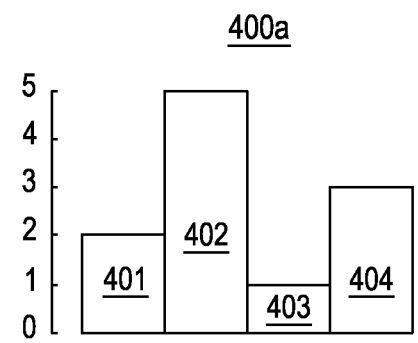
FIG. 4A is a first partial job queue of the first embodiment system.
Figure 4B:
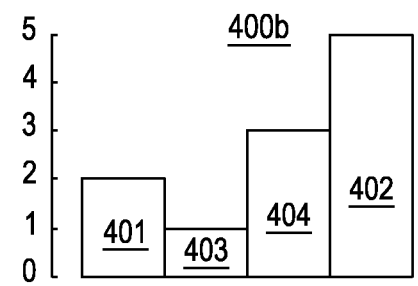
FIG. 4B is a second partial job queue of the first embodiment system.

FIGS. 4A and 4B provide a simple illustration of a queuing scenario for this system, using only backlog size as the expense metric with which to schedule compilations in future runs. Shown in FIG. 4A is a part of compilation queue 400a, which exists for just-in-time compiler mod 357 during the first run of program 112. Queue 400a includes code segments 401, 402, 403, and 404, ordered such that the leftmost code segment is the first item in the queue. The height of each code segment represents the growth in the queue during the time that segment is being compiled. Thus it can be seen that, using only the queue growth metric, code segment 402 is the most "expensive" code segment of the segments shown. It has passed the threshold of "4" in use with this system and has therefore been labeled as expensive by hint storage mod 365, which also stores this expense determination for future reference.

FIG. 4B shows part of compilation queue 400b, which exists for just-in-time compiler mod 357 during the second run of program 112. This part of queue 400b includes the same code segments as the part shown for queue 400a, and is ordered in the same fashion, with the leftmost code segment representing the first item in the queue. The height of each segment still signifies that segment's backlog size expense as measured during the first run. Because hint storage mod 365 has deemed segment 402 to be "expensive" during the first run, scheduling mod 370 has reprioritized this segment during the second run such that it will compile after segments 401, 403, and 404. Segments 401, 403, and 404 compile in the same relative order as before. In some alternative embodiments, storage mod 365 may store the actual backlog experienced during compilation of each module during the first run, and scheduling mod 370 may use that information to reprioritize at that same maximal granularity, such that compilation of segments will occur in the following order: 403, 401, 404, 402. Those of skill in the art will recognize that even with just this single metric of compilation queue backlog for a single compilation thread, various alternative storage and usage schemes are possible.

Figure 5A:
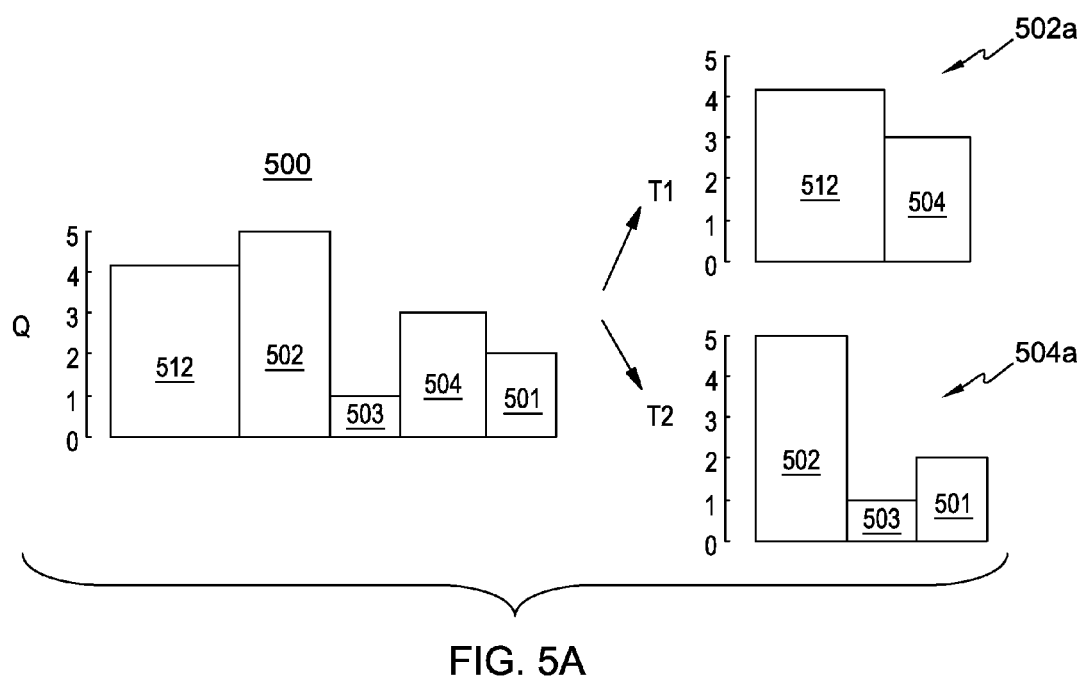
FIG. 5A is a first job queue and set of compilation threads in an embodiment of the present invention.
Figure 5B:
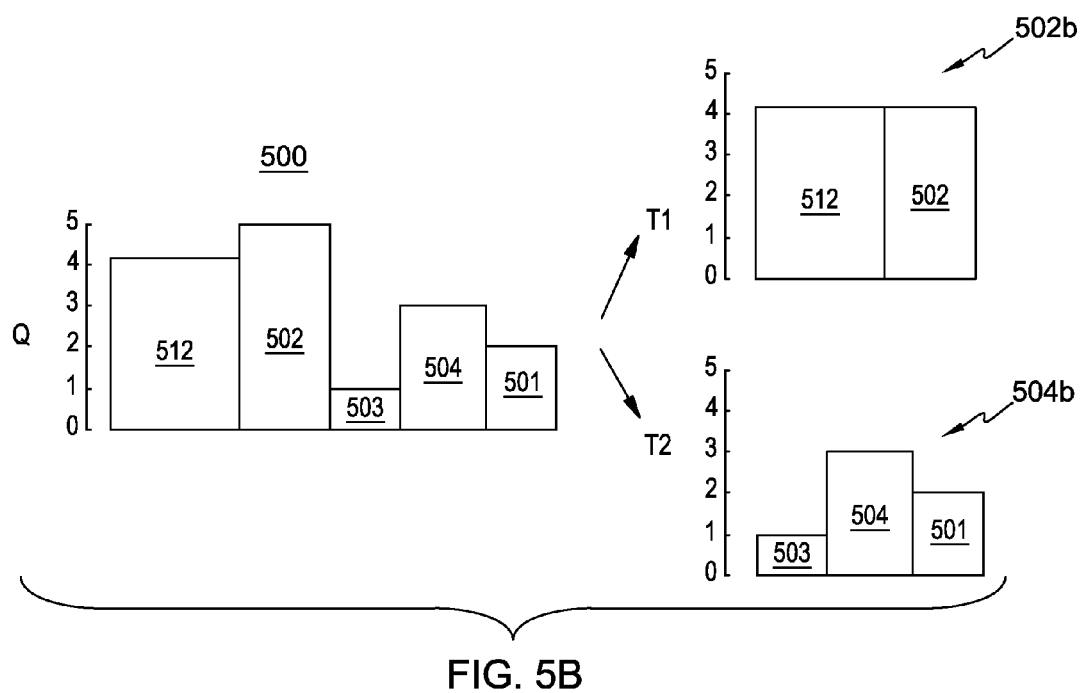
FIG. 5B is a second job queue and set of compilation threads in an embodiment of the present invention.

FIGS. 5A and 5B provide another simple illustration, this time using only information about memory usage during compilation to modify compilation behavior in future runs. Shown in FIG. 5A is queue 500 (Q) and two compilation threads of a just-in-time compiler, 502a (T1) and 504a (T2). Queue 500 is the compilation queue for the JIT compiler and contains code segments 501, 502, 503, 504, and 512 that are waiting to be compiled during the first run of a program. Queue 500 is ordered such that the leftmost code segment is the first item in the queue. The y-axis represents memory usage, while the x-axis represents time-to-compile. At this point, however, the JIT compiler knows only the order of the code segments in the queue. It therefore assigns these code segments to threads T1 and T2, as each thread becomes available to begin a new compilation, based on the order the code segments appear in the queue. For instance, it starts by assigning code segment 512 to T1 and code segment 502 to T2, at which point compilation begins on these code segments. Compilation of code segment 502 ends first, so the compiler assigns to T2 the next code segment in the queue, code segment 503. This process continues as shown in FIG. 5A until queue 500 is empty. Segments 502 and 512 have met or exceeded a memory expense threshold of 4 units, and so are determined during this first run to be "expensive." Note that peak memory usage across both threads over the course of the compilation of these code segments is 9 units, which occurred during the time code segments 512 and 502 were both being compiled. The compiler records the memory expense information for compiling each code segment and stores it for future reference.

Shown in FIG. 5B are, again, queue 500 and code segments 501, 502, 503, 504, and 512, along with thread 502b (T1) and thread 504b (T2), during a second run of the program compiled using a just-in-time compiler. The compiler assigns code segment 512 to T1 as before. However, because code segments 502 and 512 were determined to be memory expensive during the first run, and because the compiler now has access to this information, it can change its behavior accordingly. This time, the compiler notes that assigning code segment 502 to T2 would result in two expensive compilations being performed simultaneously, so it continues to scan the queue for the next code segment that has not been marked as expensive. It finds that code segment 503 meets these criteria and so assigns it to T2 instead. When T2 finishes compiling code segment 503, the compiler looks for the next item to assign to it. T1 is still compiling expensive code segment 512, so the compiler again notes that assigning code segment 502 to T2 would result in two expensive compilations being performed simultaneously. It again searches the queue for the next non-expensive code segment, assigning code segment 504 to T2 instead. T1 then finishes compiling code segment 512. Since assigning code segment 502 to T1 now would not result in two simultaneous expensive compilations, this assignment is now made. In this case, the compiler also decides to reduce the optimization level used to compile code segment 502 based on its knowledge of the memory expense of compiling code segments 502 and 504 and its desire to maintain a peak memory usage of less than 8 units if possible. Note that peak memory usage for this second run is actually 7 units, encountered when code segment 504 is being compiled, with 1 unit of memory overhead saved by rescheduling code segment 502 and one unit saved by reducing its optimization level. The compiler's scheduling process continues to assign code segments in this fashion until all code segments in the queue have been compiled.

Alternative possibilities for the above example include lowering the optimization level of compilation of code segment 502 and scheduling it concurrently with code segment 512, or rescheduling code segment 502 without lowering the optimization level. More precise decisions can be made if the JIT compiler decides to store actual values for memory consumption rather than just yes/no hints. Those of skill in the art will recognize that even with just the single metric of peak compilation memory usage, numerous alternative storage and behavior modification schemes are possible.

The generation of expensive compilation hints based on compilation environment factors, such as backlog and/or memory usage as illustrated above, may also be combined in various ways with other factors and techniques to improve just-in-time compilation performance. By way of example but not limitation, other factors may include compilation environment characteristics such as central processing unit (CPU) cycles required for compilation, code segment characteristics such as code complexity, code size, and/or cues embedded by the programmer, and runtime environment characteristics such as frequency of use of a particular code segment ("hotness"), while other techniques may include the caching of compiled segments, variable levels of optimization, and on-line and off-line profiling, to name a few.

III. FURTHER COMMENTS AND/OR EMBODIMENTS

Some embodiments of the present invention recognize that in a JAVA Virtual Machine (JVM), bytecodes are transformed into native code at runtime by a just-in-time (JIT) compiler. Such a compilation requires resources in terms of central processing unit (CPU) cycles and memory, which can affect the performance of the JVM. However, not all compilations are equally expensive. Because some compilations require a lot more resources than others, knowing something about these resource requirements ahead of time would help the JIT compiler make better decisions to improve the overall performance of the JVM.

Some embodiments of the present invention recognize that, typically, most JIT compilations happen during the startup and ramp-up stages of an application, when a large compilation request backlog is created. A JIT compiler may use various heuristics to manage this backlog by prioritizing and scheduling compilation requests. However, knowing in advance how expensive a compilation is in terms of CPU resources (cycles) can independently or in conjunction with such heuristics help with the overall strategy for resolving the backlog faster. Without such advance information, the best the JIT compiler can do is to guess the compilation complexity based on code attributes such as method size and whether the method has loops and calls to other methods. Due to factors such as inlining, however, where called segments of code are compiled "in line" with the calling segment, compilation complexity may be grossly over or under-estimated.

Some embodiments of the present invention recognize that to perform a compilation, a JIT compiler needs to allocate scratch memory for its internal data structures. Typically, the more work going into optimizing a method, the more memory the JIT compiler will need. Because this scratch memory may not be released until the end of the compilation, the peak memory consumption during compilation is important. This factor becomes crucial when the JVM runs in a constrained environment, such as in an embedded system where there is a small amount of physical memory or where there is a relatively limited address space (32-bit). Compilation overhead in terms of memory footprint is also very important in a virtualization environment that seeks to increase application density.

Some embodiments of the present invention recognize that the peak memory footprint problem is more complicated in the presence of multiple compilation threads. Ideally, the JIT compiler would refrain from performing two or more memory-hungry compilations simultaneously. Such restraint becomes possible if the JIT compiler knows ahead of time which methods require a lot of scratch memory to compile.

Some embodiments of the present invention recognize that in addition to use in compilation scheduling, memory usage information can be used to minimize the number of memory block allocations/de-allocations made, and thus can reduce the time and memory overhead (as further explained below) of a sequence of compilations. As with estimating the CPU resources of a compilation and for the same reasons, estimating the scratch memory requirement for a compilation is an error-prone task. A better alternative is needed.

Some embodiments of the present invention store hints about expensive JIT compilations in a persistent storage area and make use of this information in subsequent runs. Without the hints, the JIT compiler would have to resort to heuristic guesses about the compilation overhead. However, as mentioned above, such guesses are prone to gross errors, mainly because it is very hard to estimate how much the code will grow due to inlining. In some embodiments of the present disclosure, the compiler does not have to obey the hints indiscriminately, but can instead combine this information with information collected at runtime to improve its compilation decisions.

In some embodiments of the present invention, the amount of storage needed for the hints is small. The JIT compiler maintains two bits for each compiled method, one for CPU overhead and one for memory overhead. A set bit means that the respective method has high overhead with respect to the metric of interest (CPU or memory). Because a method can be compiled at different optimization levels (for example: cold, warm, hot, scorching), some embodiments of the present invention maintain this information for each of these levels. Thus, in an environment with four optimization levels, the JIT compiler would have 2 metrics*4 optimization levels=8 bits, or 1 byte, of information for each method. In highly constrained environments where even this amount of storage is too much, the JIT compiler could keep information only about 'cold' and 'warm' optimization levels, with the embedded assumption that a 'hot' or 'scorching' compilation is inherently expensive due to the complex optimizations used for it. On the other hand, if storage space is not a concern, the JIT compiler can keep more detailed information, such as the actual amount of memory or CPU cycles required to compile the method at a specific optimization level.

Some embodiments of the present invention store profile information about CPU and/or memory usage in an offline repository as a way of providing hints to a JIT compiler. These hints about CPU and/or memory resource usage can be combined with any other offline and/or online profiling scheme to improve the overall performance of a JVM.

In some embodiments, the persistent storage is a shared class cache, which also stores classes and ahead-of-time compiled method bodies. During subsequent invocations of the JVM, the JIT compiler retrieves the compilation hints associated with the method of interest and adjusts its operation accordingly. In some embodiments, the hint repository can be augmented/updated with additional information as it becomes available during each additional application execution.

The following paragraphs detail processes used in various embodiments of the present invention for a JIT compiler to generate hints about whether a method compilation is expensive in terms of CPU resources (cycles), as well as how the JIT compiler can take advantage of that information with minimal overhead.

In terms of making a determination, most modern operating systems offer application programming interfaces (APIs) for computing the CPU time spent in a thread. Therefore a JIT compiler can use these APIs to measure the CPU time needed to compile a particular method. A simple tracking scheme can then compare this CPU time to a given threshold. If the CPU compilation time is above the threshold, the method is deemed CPU expensive, and this information is saved to persistent storage. The problem with this approach is how to pick the threshold: faster machines require smaller thresholds, while slower machines need bigger thresholds. One solution is to set and/or change the threshold dynamically by keeping runtime statistics on the compilations performed so far and deeming a compilation expensive if, for example, it takes longer than one standard deviation more than the running mean compilation time.

An alternative approach starts from the observation that a long compilation is more detrimental when it delays other compilations queued behind it. A JIT compiler can measure how much the compilation backlog has increased during the compilation of the current method. If the increase in the backlog exceeds a certain threshold, the JIT compiler declares the method to be expensive to compile and records the pertinent information in persistent storage. The information to be stored can be just one bit per compilation level (see above). If storage space is not a concern, the JIT compiler can store the actual value of the compilation backlog increase (again, per compilation level), or if space is of moderate concern, it can store the actual value capped at 255 so that it is guaranteed to fit in only one byte per compilation level.

In subsequent runs, when the JVM issues a compilation request for a method, it reads from persistent storage the relevant information associated with the method. Each compilation request has an associated priority and the request is inserted into the compilation queue based on this priority. A compilation request which is expected to consume significant CPU resources (thereby blocking other compilation requests for extended periods of time) will receive a smaller priority. Such requests will be served when no other higher priority request exists and therefore the likelihood of this request delaying many other requests is reduced. Alternatively, the expensive compilations could be scheduled during periods when the JVM is otherwise idle or at least outside important phases of execution like startup or steady state. Still another alternative is to let the JIT compiler perform the expensive compilation at a lower optimization level, thus taking fewer CPU resources. Such approaches can be used independently or combined with other schemes and constraints to improve the overall performance of a JVM.

The following paragraphs detail processes used in various embodiments of the present invention for a JIT compiler to generate hints about compilation overhead in terms of memory footprint, as well as how the JIT compiler can take advantage of that information.

In terms of making a determination, a memory allocator used by a JIT compiler will typically have support for computing the scratch memory in use by a compilation. At the end of a compilation the JIT compiler can read out this value and determine whether this compilation is memory expensive by comparing the scratch memory value to a given threshold. The amount of memory needed by a compilation is quite stable with respect to machines of different speeds, so finding an appropriate threshold is easier than in the case of CPU-expensive compilations.

Alternatively, if storage space is not a concern, the JIT compiler could record not only whether the compilation is memory expensive, but also the actual amount of scratch memory required to compile the method. If storage space is of moderate concern, this recordation can be done at a coarse granularity to conserve space: for example, the JIT compiler could record memory requirements in 1 MB increments capped at 255, thus guaranteed to take only one byte (per compilation level).

In terms of exploitation, the major goal is to limit the peak of scratch memory consumption. If a compilation is deemed expensive at a certain optimization level, the JIT compiler can downgrade the compilation to a lower optimization level which is expected to have lower memory requirements. Additionally, when multiple compilation threads are used, the JIT can avoid scheduling two memory expensive compilations at the same time (even when compilation has been downgraded it may still remain memory expensive relative to the threshold picked).

Also important is memory allocation/deallocation overhead. Thus instead of allocating memory from the operating system conservatively, block by block, as the compilation progresses, the JIT compiler can allocate memory in large chunks, basing its decisions on the compilation footprint hints (these large chunks can be parsed internally into smaller units as needed). Moreover, at the end of the compilation the JIT compiler may choose not to free the scratch memory. Instead, it can scan the compilation queue and retain as much memory as needed to serve the most memory-expensive request in the queue. This will save CPU cycles by avoiding repeated deallocation/allocation operations, and minimize the effect of the malloced-then-freed problem (that is, memory management inefficiencies due to the inability of an application to exert fine-grained control over how an operating system handles the memory blocks that application deallocates; for further background on the malloced-then-freed problem, see OGATA et al., "A Study of Java's Non-Java Memory", OOPSLA/SPLASH'10 Oct. 17-21, 2010, Reno/Tahoe, Nev., USA, ACM, pp. 191-204).

Some embodiments of the present invention include one, or more, of the following features, characteristics and/or advantages: (i) turn data from self-instrumentation mechanisms of managed runtimes into hints that persist in a cache; (ii) augment existing compilation control heuristics; (iii) have a feedback mechanism for managing JIT compilation resources that offers compilation hints to guide compilation via a shared classes cache; (iv) use the compilation queue length (backlog) as a metric; (v) use a compact representation for persisting compilation expense information; (vi) employ profile-directed feedback technology, where information about compilation complexity and resource consumption is used to more optimally compile a given method in the future (note: as those of skill in the art will appreciate, such heuristic-based methods, where often parameters are chosen based on current applications of interest may have varying degrees of success when applied to other variations or future applications, or where future compiles differ from past compiles; other techniques may be employed as a supplement to the techniques described herein to mitigate such effects); (vii) create a performance advantage through smarter compilation, enabling delivery of a more efficient managed runtime environment which can further allow more optimization within the same resource envelop; (viii) use a shared classes infrastructure to better balance throughput and startup/rampup needs; (ix) collect the hints dynamically (online); (x) do not store hints in the source code itself; and/or (xi) prioritize method compilation.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Software storage device: any device (or set of devices) capable of storing computer code in a manner less transient than a signal in transit.

Tangible medium software storage device: any software storage device (see Definition, above) that stores the computer code in and/or on a tangible medium.

Non-transitory software storage device: any software storage device (see Definition, above) that stores the computer code in a non-transitory manner.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

Persistent storage: storage persistent enough such that information stored therein by a just-in-time compiler when compiling a code segment is available to be used by a just-in-time compiler when compiling the same code segment a second time.

Changing compilation behavior: performing a compilation in a way that is different to how the compilation would be performed absent consideration of the information provided by various embodiments of the present invention.

What is claimed is:

1. A method comprising:
   measuring a set of characteristic(s) of a compilation environment during a compilation of a code segment by a just-in-time compiler;
   determining a first piece of information based upon at least one characteristic of the set of characteristic(s), with the first piece of information being relevant to a manner in which just-in-time compilation of the code segment may be performed;
   storing the first piece of information in a persistent storage device;
   responsive to a subsequent compilation request for the just-in-time compiler to compile the code segment, reading the first piece of information from the persistent storage device; and
   changing compilation behavior based on the first piece of information when the code segment is again compiled by the just-in-time compiler in response to the subsequent compilation request;
   wherein:
   the set of characteristic(s) of a compilation environment relates to the compilation backlog;
   the first piece of information is based on size of the compilation backlog and is stored in more than a single bit per compiler optimization level; and
   the changing of compilation behavior includes at least one of the following: (i) scheduling the subsequent compilation request, and/or (ii) adjusting a compiler optimization level.

2. The method of claim 1 wherein the change of compilation behavior includes scheduling the subsequent compilation request by assigning the code segment a queue priority.

3. A method comprising:
   measuring a set of characteristic(s) of a compilation environment during a compilation of a code segment by a just-in-time compiler;
   determining a first piece of information based upon at least one characteristic of the set of characteristic(s), with the first piece of information being relevant to a manner in which just-in-time compilation of the code segment may be performed;

storing the first piece of information in a persistent storage device;

responsive to a subsequent compilation request for the just-in-time compiler to compile the code segment, reading the first piece of information from the persistent storage device; and changing compilation behavior based on the first piece of information when the code segment is again compiled by the just-in-time compiler in response to the subsequent compilation request;

wherein:

the set of characteristic(s) of a compilation environment relates to peak memory usage;

the first piece of information represents a range containing a value of the peak memory used to compile the code segment; and the change of compilation behavior includes reducing the compiler optimization level used when compiling the code segment.

4. A method comprising:

measuring a set of characteristic(s) of a compilation environment during a compilation of a code segment by a just-in-time compiler;

determining a first piece of information based upon at least one characteristic of the set of characteristic(s), with the first piece of information being relevant to a manner in which just-in-time compilation of the code segment may be performed;

storing the first piece of information in a persistent storage device;

responsive to a subsequent compilation request for the just-in-time compiler to compile the code segment, reading the first piece of information from the persistent storage device; and changing compilation behavior based on the first piece of information when the code segment is again compiled by the just-in-time compiler in response to the subsequent compilation request;

wherein:

the set of characteristic(s) of a compilation environment relates to peak memory usage;

the first piece of information represents a range containing a value of the peak memory used to compile the code segment; and the change of compilation behavior includes scheduling the subsequent compilation request so as to reduce peak memory usage from overlapping compilations of the code segment and another code segment(s).

\* \* \* \* \*